US008849440B2

(12) United States Patent
Grant et al.

(10) Patent No.: US 8,849,440 B2
(45) Date of Patent: Sep. 30, 2014

(54) MANUFACTURING CONTROL BASED ON A FINAL DESIGN STRUCTURE INCORPORATING BOTH LAYOUT AND CLIENT-SPECIFIC MANUFACTURING INFORMATION

(75) Inventors: Casey J. Grant, Hinesburg, VT (US); Kurt A. Tallman, Essex Junction, VT (US); Sabastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 13/485,862

(22) Filed: May 31, 2012

(65) Prior Publication Data

US 2013/0325156 A1 Dec. 5, 2013

(51) Int. Cl.
*G05B 13/02* (2006.01)

(52) U.S. Cl.
USPC ............... 700/97; 700/95; 700/105; 700/121

(58) Field of Classification Search
None
See application file for complete search history.

(56) References Cited

U.S. PATENT DOCUMENTS

| | | | |
|---|---|---|---|
| 6,240,331 B1 | 5/2001 | Yun | |
| 6,442,748 B1 * | 8/2002 | Bowman-Amuah | 717/108 |
| 6,594,799 B1 * | 7/2003 | Robertson et al. | 716/100 |
| 6,686,253 B2 | 2/2004 | Or-Bach | |
| 6,725,237 B2 | 4/2004 | Clairmont et al. | |
| 6,748,286 B1 * | 6/2004 | Losch | 700/97 |
| 6,922,823 B2 | 7/2005 | Tester | |
| 6,954,907 B2 | 10/2005 | Nakano et al. | |
| 7,003,362 B2 | 2/2006 | Tsao et al. | |
| 7,003,371 B2 * | 2/2006 | Tsuchida et al. | 700/97 |
| 7,062,324 B2 | 6/2006 | Schuler et al. | |
| 7,062,342 B1 * | 6/2006 | Feng et al. | 700/97 |
| 7,174,520 B2 * | 2/2007 | White et al. | 716/136 |
| 7,275,234 B2 * | 9/2007 | Barrett et al. | 716/52 |
| 7,363,099 B2 * | 4/2008 | Smith et al. | 700/121 |
| 7,523,429 B2 * | 4/2009 | Kroyan et al. | 716/119 |
| 7,531,368 B2 * | 5/2009 | Winkler et al. | 438/5 |
| 7,685,545 B2 | 3/2010 | Chapman et al. | |

(Continued)

OTHER PUBLICATIONS

Quik-Pak, Wafer Preparation Wafer Dicing, Wafer Backgrinding, Wafer Washing—Quik-Pak Delphon Industries icproto.com Wayback Machine ARchives.org Sep. 19, 2011 <http://www.icproto.com/capabilities-services/wafer-preparation/>.*

(Continued)

*Primary Examiner* — Ryan Jarrett
*Assistant Examiner* — Michael J. Scapin
(74) *Attorney, Agent, or Firm* — Gibb & Riley, LLC

(57) ABSTRACT

Disclosed are embodiments of an improved design method, the results of which are a final design structure for an integrated circuit that incorporates, not only layout information, but also client-specific manufacturing information (e.g., import/export information, service requests, processing directives, purchase order requirements, design rule information, etc.) in the same data format in hierarchical form. Also disclosed are embodiments of a manufacturing control method and system. In these embodiments, a final design structure, such as that described above, is received at tape-in. The information contained therein (particularly, the client-specific manufacturing information) is sorted by type and then forwarded to the appropriate tools within the manufacturing facility for processing. By providing the client-specific manufacturing information directly to each manufacturing facility in the final design structure in conjunction with the layout information, the embodiments eliminate the need for independent information gathering by each manufacturing facility.

18 Claims, 5 Drawing Sheets

(56) References Cited

U.S. PATENT DOCUMENTS

| | | | |
|---|---|---|---|
| 7,735,029 B2* | 6/2010 | Riviere-Cazaux | 716/135 |
| 7,801,635 B2* | 9/2010 | Funk et al. | 700/121 |
| 8,050,793 B1 | 11/2011 | Haskins et al. | |
| 8,156,451 B2* | 4/2012 | Nagamura et al. | 716/54 |
| 8,165,707 B2* | 4/2012 | Enright et al. | 700/103 |
| 8,171,443 B1* | 5/2012 | Chan et al. | 716/121 |
| 8,214,069 B2* | 7/2012 | Yucel et al. | 700/97 |
| 8,219,451 B2* | 7/2012 | Kreidler et al. | 700/169 |
| 8,244,389 B2* | 8/2012 | Krachtus | 700/97 |
| 8,261,217 B2* | 9/2012 | Kobayashi | 716/54 |
| 8,326,926 B2* | 12/2012 | Sangem et al. | 709/204 |
| 8,352,891 B2* | 1/2013 | Reid et al. | 716/55 |
| 8,522,848 B2* | 9/2013 | Sheats | 156/384 |
| 2002/0062280 A1* | 5/2002 | Zachariassen et al. | 705/39 |
| 2003/0204527 A1* | 10/2003 | Callahan | 700/95 |
| 2004/0181769 A1* | 9/2004 | Kochpatcharin et al. | 716/19 |
| 2005/0010890 A1* | 1/2005 | Nehmadi et al. | 716/19 |
| 2005/0055659 A1* | 3/2005 | Croke et al. | 716/19 |
| 2005/0188339 A1* | 8/2005 | Anderson | 716/11 |
| 2006/0074506 A1* | 4/2006 | Braun et al. | 700/96 |
| 2006/0074510 A1* | 4/2006 | Schepp et al. | 700/121 |
| 2006/0117012 A1* | 6/2006 | Rizzolo et al. | 707/9 |
| 2006/0161452 A1 | 7/2006 | Hess | |
| 2006/0224264 A1* | 10/2006 | Wang et al. | 700/97 |
| 2007/0038967 A1* | 2/2007 | Brathwaite et al. | 716/1 |
| 2007/0250800 A1* | 10/2007 | Keswick | 716/8 |
| 2009/0240366 A1* | 9/2009 | Kaushal et al. | 700/110 |
| 2010/0119144 A1* | 5/2010 | Kulkarni et al. | 382/149 |
| 2011/0098837 A1* | 4/2011 | Yucel et al. | 700/104 |
| 2011/0140278 A1* | 6/2011 | Chen et al. | 257/773 |
| 2011/0265054 A1 | 10/2011 | Ferguson et al. | |
| 2012/0110595 A1* | 5/2012 | Reitman et al. | 719/313 |
| 2012/0297352 A1* | 11/2012 | Filippi et al. | 716/112 |
| 2013/0111422 A1* | 5/2013 | Reed et al. | 716/102 |

OTHER PUBLICATIONS

MOSIS Packaging Options Packages Available From MOSIS for Designs Fabricated Thru MOSIS.com Wayback Machine accessed Feb. 1, 2012.*

IBM Case Study, IBM Case Study, Implementing a state-of-the-art solution for export control-handling with SAP, http://www-03.ibm.com/software/businesscasestudies/us/en/corp?synkey=K132550V95154W17>, IBM Published Oct. 5, 2010.*

Hunter, et al., "Combining Advanced Process Technology and Design for Systems Level Integration," Proceedings IEEE 2000 First International Symposium on Quality, IEEE Computer Soc., San Jose, CA, Mar. 20-22, 2000, pp. 245-250.

* cited by examiner

193

| Information Type | Layers |
|---|---|
| ⋮ | ⋮ |
| Import/Export Information | 201-210 |
| Service Requests | 211-220 |
| Processing Directives | 221-230 |
| Purchase Order Requirements | 231-240 |
| Design Rule Information | 241-250 |

MANUFACTURING CONTROL BASED ON A FINAL DESIGN STRUCTURE INCORPORATING BOTH LAYOUT AND CLIENT-SPECIFIC MANUFACTURING INFORMATION

BACKGROUND

1. Field of the Invention

The embodiments disclosed herein relate to integrated circuit design and manufacture and, more particularly, to an integrated circuit design method that incorporates both layout and client-specific manufacturing information into a final design structure and an integrated circuit manufacturing control method and an associated system that process such a final design structure.

2. Description of the Related Art

In integrated circuit design, the term "tape-out" typically refers to the final results of the design flow, when a final design structure (i.e., an approved computer-aided design (CAD) file), which contains all of the layout information for a specific integrated circuit, is sent out (e.g., to a manufacturing facility (also referred to herein as a foundry or fabrication facility) for mask generation followed by fabrication. The term "tape-in" typically refers to receipt by one or more manufacturing facilities of the final design structure. In addition to tape-in, various stand-alone inputs are submitted to the manufacturing facility from other sources (i.e., from sources other than the integrated circuit designer or developer). These stand-alone inputs can include, but are not limited to, supplemental manufacturing requirements, requests, and other project-related inputs. Such stand-alone inputs can be received by the manufacturing facility in different formats. Additionally, when the same integrated circuit design is ported to multiple different manufacturing facilities, the stand-alone input received by each manufacturing facility may vary. As a result, problems are created for entities that want to port the same integrated circuit design to multiple manufacturing facilities with uniform results.

SUMMARY

In view of the foregoing, disclosed herein are embodiments of an improved design method (i.e., an improved design flow), the results of which are a final design structure for an integrated circuit that incorporates, not only layout information, but also client-specific manufacturing information (e.g., import/export information, service requests, processing directives, purchase order requirements, design rule information, etc.) in the same data format in hierarchical form. Also disclosed herein are embodiments of a manufacturing control method and an associated system. In these embodiments, a final design structure, such as that described above, is accessed (e.g., by the manufacturing control system of a manufacturing facility). The information contained within the final design structure and, particularly, the client-specific manufacturing information is sorted by type and then forwarded to the appropriate tools within the manufacturing facility for processing. By providing the client-specific manufacturing information directly to each manufacturing facility in the final design structure in conjunction with the layout information, the embodiments eliminate the need for independent information gathering by each manufacturing facility and, thereby provide for more uniform results across the different manufacturing facilities.

More particularly, disclosed herein are embodiments of a computer-implemented design method. The design method can comprise processing (e.g., by a computer system, such as a computer-aided design (CAD) system) various inputs including, for example, an input design structure, design specifications, characterization data, verification data, designer or developer-specified design rules, etc. as well as client-specific manufacturing information (e.g., import/export information, service requests, processing directives, purchase order requirements, design rule information, etc.), etc. in order to generate a final design structure. This final design structure can comprise at least layout information for the integrated circuit and the client-specific manufacturing information for the integrated circuit. Once generated, the final design structure for the integrated circuit can be stored (e.g., by the computer system) on a machine-readable medium in a data format (e.g., a graphic data system (GDS) II format or open artwork system interchange standard (OASIS) format) that represents the layout information and the client-specific manufacturing information in hierarchical form. This machine-readable medium can then be released to one or more manufacturing facilities. By releasing the client-specific manufacturing information directly to each manufacturing facility in the final design structure in conjunction with the layout information, the embodiments eliminate the need for independent information gathering by each manufacturing facility and, thereby provide for more uniform results across the different manufacturing facilities.

Disclosed herein are also embodiments of a computer-implemented manufacturing control method. This manufacturing control method can comprise accessing (e.g., by a computer system and, particularly, by manufacturing control system from a machine-readable medium) a final design structure for an integrated circuit. This final design structure can comprise at least the layout information for the integrated circuit and client-specific manufacturing information (e.g., import/export information, service requests, processing directives, purchase order requirements, design rule information, etc.) for the integrated circuit. Additionally, this final design structure can be stored on the machine-readable medium in a data format (e.g., a graphic data system (GDS) II format or open artwork system interchange standard (OASIS) format) that represents the layout information and the client-specific manufacturing information in hierarchical form. Once the final design structure is accessed, the information contained therein can be sorted (e.g., by the computer system). Specifically, the client-specific manufacturing information can be sorted from the layout information and can further be sorted by type. Once sorted, the client-specific manufacturing information can be forwarded, as appropriate, to selected tool(s) in the manufacturing facility for use during manufacturing of the integrated circuit.

Disclosed herein are also embodiments of a manufacturing control system. This manufacturing control system can comprise a machine-readable medium storing a final design structure for an integrated circuit. This final design structure can comprise at least the layout information for the integrated circuit and client-specific manufacturing information (e.g., import/export information, service requests, processing directives, purchase order requirements, design rule information, etc.) for the integrated circuit. Additionally, this final design structure can be stored on the machine-readable medium in a data format (e.g., a graphic data system (GDS) II format or open artwork system interchange standard (OASIS) format) that represents the layout information and the client-specific manufacturing information in hierarchical form. This manufacturing control system can further comprise at least one processor in communication with the machine-readable medium. Specifically, the processor(s) can comprise at least a parsing tool and a logistics tool. The parsing tool can access the final design structure and sort the information contained therein. That is, the parsing tool can sort the client-specific manufacturing information from the layout information and can further sort the client-specific manufacturing information by type. Once the parsing tool has sorted the information contained in the final design structure, the logistics tool can forward the client-specific manufacturing information to selected tool(s) in the manufacturing facility, as appropriate, for use during manufacturing of the integrated circuit.

BRIEF DESCRIPTION OF THE DRAWINGS

The embodiments disclosed herein will be better understood from the detailed description with reference to the following drawings, which are not necessarily drawn to scale and in which.

DETAILED DESCRIPTION

Figure 1:
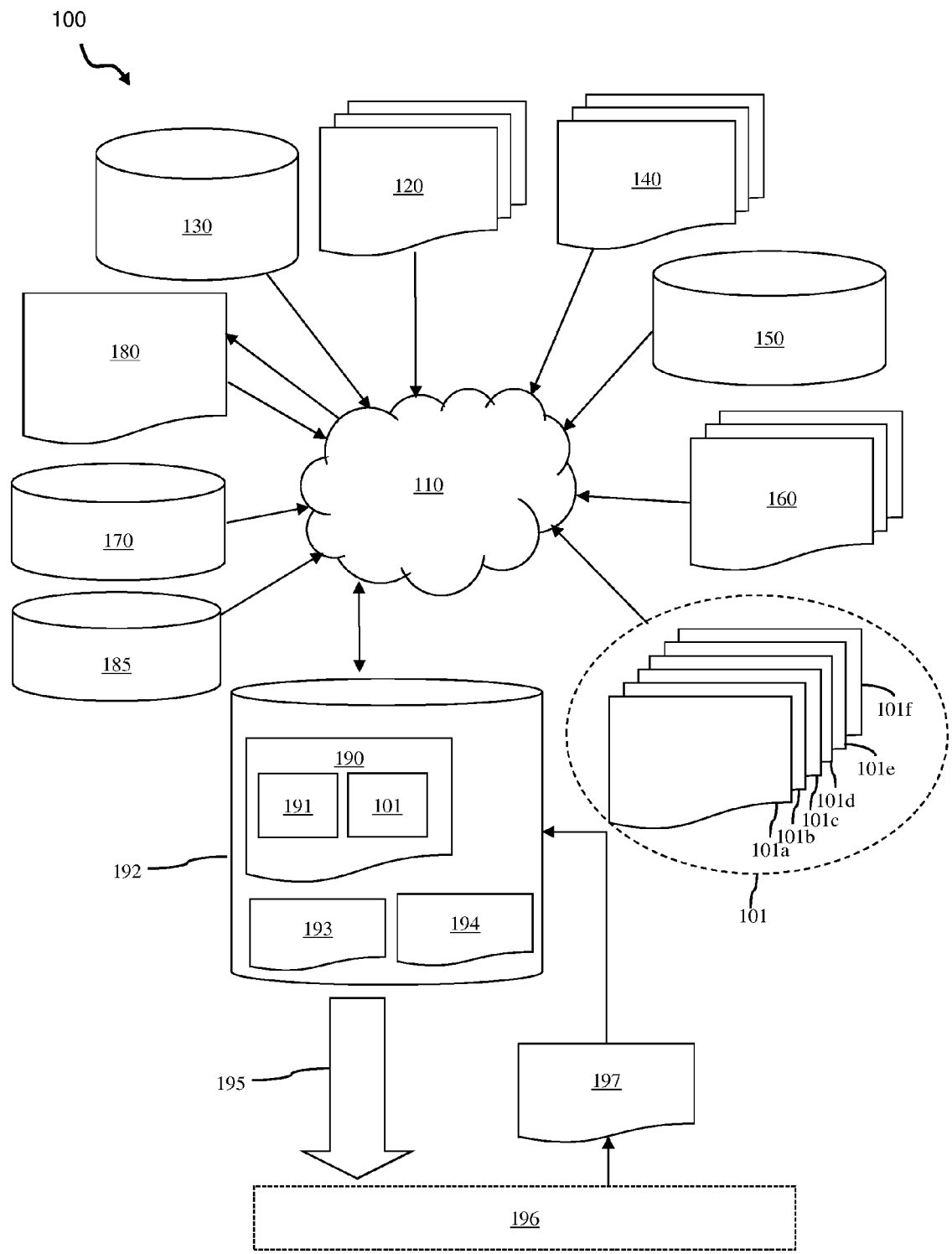
FIG. 1 is a diagram illustrating an embodiment of a computer-implemented design method.

As mentioned above, in integrated circuit design, the term "tape-out" typically refers to the final results of the design flow, when a final design structure (i.e., an approved computer-aided design (CAD) file), which contains all of the layout information for a specific integrated circuit (IC) design, is sent out (e.g., to a manufacturing facility) for mask generation followed by fabrication. The term "tape-in" typically refers to receipt by a manufacturing facility or multiple different manufacturing facilities of the final design structure (i.e., of the finally approved CAD file). In addition to tape-in, various stand-alone inputs are submitted to the manufacturing facility from other sources (i.e., from sources other than the integrated circuit designer or developer). These stand-alone inputs can include, but are not limited to, supplemental manufacturing requirements, requests, and other project-related inputs. Such stand-alone inputs can be received by the manufacturing facility in different formats. Additionally, when the same integrated circuit design is ported to multiple different manufacturing facilities, the stand-alone input received by each manufacturing facility may vary. As a result, problems are created for entities that want to port the same integrated circuit design to multiple manufacturing facilities with uniform results.

For example, typically, when multiple different manufacturing facilities receive the same final design structure, they each must independently acquire client-specific manufacturing information including, but not limited to, import/export information, service requests, processing directives, purchase order requirements, and design rule information. Since this information is independently acquired, it is often different from one facility to the next and, thus, even though the integrated circuits are manufactured based on the same final design structure (i.e., the same CAD file), additional stresses, delays, and even outright mistakes can occur. Furthermore, additional costs may be incurred, for example, to perform facility-specific training, to correct facility-specific mistakes (e.g., in forms), to perform facility-specific design rule checking (DRC), etc.

In view of the foregoing, disclosed herein are embodiments of an improved design method (i.e., an improved design flow), the results of which are a final design structure for an integrated circuit that incorporates, not only layout information, but also client-specific manufacturing information (e.g., import/export information, service requests, processing directives, purchase order requirements, design rule information, etc.) in the same data format in hierarchical form. Also disclosed herein are embodiments of a manufacturing control method and an associated system. In these embodiments, a final design structure, such as that described above, is accessed (e.g., by the manufacturing control system of a manufacturing facility). The information contained within the final design structure and, particularly, the client-specific manufacturing information is sorted by type and then forwarded to the appropriate tools within the manufacturing facility for processing. By providing the client-specific manufacturing information directly to each manufacturing facility in the final design structure in conjunction with the layout information, the embodiments eliminate the need for independent information gathering by each manufacturing facility and, thereby provide for more uniform results across the different manufacturing facilities.

More particularly, referring to FIG. 1, disclosed herein are embodiments of a computer-implemented design method 100 (i.e., a computer-implemented design flow). The design method, like conventional design methods, can comprise processing (e.g., by a computer system and, particularly, a computer-aided design (CAD) system) various inputs in order to generate a final design structure. However, in the embodiments disclosed herein, these inputs can include, not only an input design structure, design specifications, characterization data, verification data, designer or developer-specified design rules, etc., but also client-specific manufacturing information (see detailed discussion below).

Specifically, this design flow 100 includes processes, machines and/or mechanisms for processing an input design structure 120 for an integrated circuit and generating a final design structure 190 for the integrated circuit. The design structures 120, 190, which are processed and/or generated, by the design flow 100 may be encoded on a machine-readable medium (e.g., a machine-readable transmission medium or storage medium) to include data and/or instructions that when executed or otherwise processed by a machine generate a logically, structurally, mechanically, or otherwise functionally equivalent representation of the integrated circuit. For purposes of this disclosure such machines include, but are not limited to, any machine used in design, test, simulation and manufacture of the integrated circuits structure. For example, such machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

The design flow 100 may vary depending on the type of integrated circuit being designed. For example, a design flow 100 for building an application specific IC (ASIC) may differ from a design flow 100 for designing a standard component or from a design flow 100 for instantiating the design into a programmable array. As shown in FIG. 1, the design flow 100 can comprise receiving an input design structure 120, processing the input design structure 120 along with additional data and information, and outputting a final design structure 190.

In any case, the input design structure 120 may be processed using a design process 110. This design process 110 is similar to the design process used in conventional design flows; however, it is also distinct from the design process used in conventional design flows given the different inputs processed and the resulting output. Specifically, the input design structure 120 may be a logical simulation design structure generated and processed by design process 110 to produce a logically equivalent functional representation of a hardware device. The input design structure 120 may additionally or alternatively comprise data and/or program instructions that when processed by a design process 110, generate a functional representation of the physical structure of the integrated circuit. Whether representing functional and/or structural design features, the input design structure 120 may be generated using an electronic computer-aided design (CAD) system such as implemented by a core developer/designer. When encoded on a machine-readable medium (e.g., a data storage medium or programmed into a programmable gate array), the input design structure 120 may be accessed and processed by one or more hardware and/or software modules within design process 110 to simulate or otherwise functionally represent the integrated circuit. As such, the input design structure 120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

The design process 110 may employ and incorporate hardware and/or software modules for synthesizing, translating, or otherwise processing a design/simulation functional equivalent of the integrated circuit to generate a netlist 180 which may contain design structures such as the input design structure 120. The netlist 180 may comprise, for example, compiled or otherwise processed data structures representing a list of wires, discrete components, logic gates, control circuits, I/O devices, models, etc. that describes the connections to other elements and circuits in the integrated circuit. The netlist 180 may be synthesized using an iterative process in which netlist 180 is resynthesized one or more times depending on design specifications and parameters for the device. As with other design structure types described herein, netlist 180 may be recorded on a machine-readable medium (e.g., a data storage medium or programmed into a programmable gate array). The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

The design process 110 may further employ and incorporate hardware and/or software modules for processing a variety of other input data structure types including the netlist 180. Such data structure types may reside, for example, within library elements 130 and include a set of commonly used elements, circuits, and devices, including models, layouts, and symbolic representations, for a given manufacturing technology (e.g., different technology nodes, 32 nm, 45 nm, 90 nm, etc.). The data structure types may further comprise design specifications 140, characterization data 150, verification data 160, designer or developer-specified design rules 170, and test data files 185, which may include input test patterns, output test results, and other testing information. The design process 110 may further comprise, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 110 without deviating from the scope and spirit of the disclosed embodiments. The design process 110 may also employ and incorporate hardware and/or software modules for performing standard circuit design processes such as timing analysis, verification, design rule checking, place and route operations, etc.

As in a conventional integrated circuit design flow, the design process 110 may further employ and incorporate logic and physical design tools (e.g., HDL compilers and simulation model build tools) to process the input design structure 120 together with some or all of the inputs or data structure types referenced above (e.g., design specifications 140, characterization data 150, verification data 160, designer or developer-specified design rules 170, and test data files 185) to generate a second (i.e., final) design structure 190. However, in the embodiments disclosed herein, the inputs processed at design process 110 in order to generate the final design structure 190, not only include the inputs referenced above, but also include previously acquired and stored client-specific manufacturing information. That is, in the embodiments disclosed herein, the design process 110 may employ and incorporate the logic and physical design tools to process the input design structure 120 with some or all of the inputs used in the design process of a conventional integrated circuit design flow (e.g., design specifications 140, characterization data 150, verification data 160, designer or developer-specified design rules 170, and test data files 185) and also with previously acquired and stored client-specific manufacturing information 101.

For purposes of this disclosure, it should be understood that the term "client" refers to an entity or customer that intends to have (e.g., that has contracted to have) an integrated circuit manufactured by one or more manufacturing facilities using a finally-approved design generated by a designer (also referred to herein as a developer) during a design flow. The term "client-specific" manufacturing information does not refer to information conventionally specified by a designer or developer during the integrated circuit design flow and related to the design, manufacture, test, etc. of the integrated circuit structure itself, as designed. Instead the term "client-specific" manufacturing information refers to information specified by the client or specified by some other entity not the designer or developer, which is separate from the design, manufacture, test, etc. of the integrated circuit itself, but which may impact processes performed by one or more tools of a manufacturing facility during manufacturing of the integrated circuit structure. Specifically, such client-specific manufacturing information 101 can include, but is not limited to, client-specific import/export information 101*a*, client-specific service requests 101*b*, client-specific processing directives 101*c*, purchase order requirements 101*d*, client-specific design rule information 101*e*, or any other client-specified manufacturing information 101*f*. For example, the client-specific import/ export information can comprise, for example, web-based import/export forms, an export control classification number (ECCN), an international traffic arms (ITAR) number, a harmonized system (HS) classification number, etc. for the integrated circuit or product within which it will be incorporated. Client-specific service requests can comprise, for example, service requests for backside grinding, for dicing, for formation of kerf structures for in-process testing, etc. Client-specific processing directives can comprise effective channel length (Leff) striping, threshold voltage (Vt) splitting, custom processing, etc. The purchase order requirements can comprise, for example, the number of wafers, etc. The client-specific design rule information can comprise, client-submitted logs, the design rule checking (DRC) deck version used, the ground rules (GR) checked, etc.

The final output of this design process 110 can comprise a final design structure 190 that comprises at least layout information 191 (i.e., layout parameters) for the integrated circuit and the client-specific manufacturing information 101 for the integrated circuit. The final design structure 190 may also comprise other information such as, for example, symbolic data, map files, test data files, design content files, manufacturing data, wires, levels of metal, vias, shapes, data for routing through the manufacturing line, or other data required by a manufacturer to produce the integrated circuit, as designed by the designer.

This final design structure 190, including the layout information 191 and the client-specific manufacturing information 101, can be stored (e.g., by the CAD system) on a machine-readable medium 192 (e.g., a storage medium or programmable gate array) in a data format that represents the layout information, the client-specific manufacturing information, etc. in hierarchical form (i.e., at different layers or cells). For example, the information in the final design structure 190 can be stored on the machine-readable medium 192 in a graphic database system (GDS) II format. The GDS II format is a binary file format that typically represents the geometric shapes, text labels and other information about the layout of an integrated circuit in hierarchical form (i.e., at different layers or cells). The GDS II format can be adapted herein to further represent other information, including the client-specific manufacturing information 101 also in the hierarchical form (i.e., at different layers or cells). Other such formats which can be adapted to represent the layout information as well as other information, including client-specific manufacturing information 101 in this manner include, for example: the GDS format, which preceded the GDS II format; the open artwork system interchange standard (OASIS) format, which is a recent successor to the GDS II format; GL1; map files, etc.

In any case, the final design structure 190, like the input design structure 120, may also comprise one or more files, data structures, or other computer-encoded data or instructions that reside on the machine-readable medium 192 and that when processed by a computer system (e.g., an electronic computer-aided design (CAD) system) generate a logically or otherwise functionally equivalent form of one or more embodiments of the integrated circuits structure. The final design structure 190 may also comprise a compiled, executable HDL simulation model that functionally simulates the integrated circuit.

Figure 2:
FIG. 2 is a table illustrating an exemplary index that maps different types of the client-specific manufacturing information to different data format levels.

It should be noted that the design process 110 can also comprise storing (e.g., by CAD system on the same machine-readable medium) an index 193 specifying the type of information at each of the different data format levels. Thus, for example, as shown in the table of FIG. 2, the index 193 can map the different types of the client-specific manufacturing information to different data format levels for subsequent sorting and use by a manufacturing facility. As illustrated, client-specific import/export information is represented in layers 201-210, client-specific service requests are represented in layers 211-220, client-specific processing directives are represented in layers 221-230, purchase order requirements are represented in layers 231-240, and client-specific design rule information is represented in layers 241-250, and so on.

The final design structure 190 stored on the machine-readable medium 192 may then proceed to tape-out 195. As mentioned above, in integrated circuit design, the term "tape-out" typically refers to the final results of the design flow, when the final design structure 190 (i.e., an approved computer-aided design (CAD) file), is sent out to one or more manufacturing facilities 196 for mask generation followed by fabrication. By releasing the client-specific manufacturing information 101 directly to each manufacturing facility 196 in the final design structure 190 in conjunction with the layout information 191, the embodiments eliminate the need for independent information gathering by each manufacturing facility 196 and, thereby provide for more uniform results across the different manufacturing facilities.

It should be noted that feedback information 197 can be received back into the design flow 100 from one or more of the manufacturing facilities 196, which are engaged in manufacturing the integrated circuit using the final design structure 190. For example, one of the manufacturing facilities processing the final design structure 190 can update the final design structure 190 on a layer by layer based on feedback information 197, thereby creating an updated final design structure 194, which is similarly stored on the machine-readable medium 192. This updated final design structure 194 can then be accessed and used by the designer/developer to similarly update the client-specific manufacturing information 101 or any other information in the final design structure, which is provided to other manufacturing facilities. That is, the updated final design structure 194 can then be released to the other manufacturing facilities 196, thereby allowing the other manufacturing facilities to make modifications in subsequent manufacturing processes or, if practical, to the current manufacturing processes in order to ensure uniform results.

Figure 3:
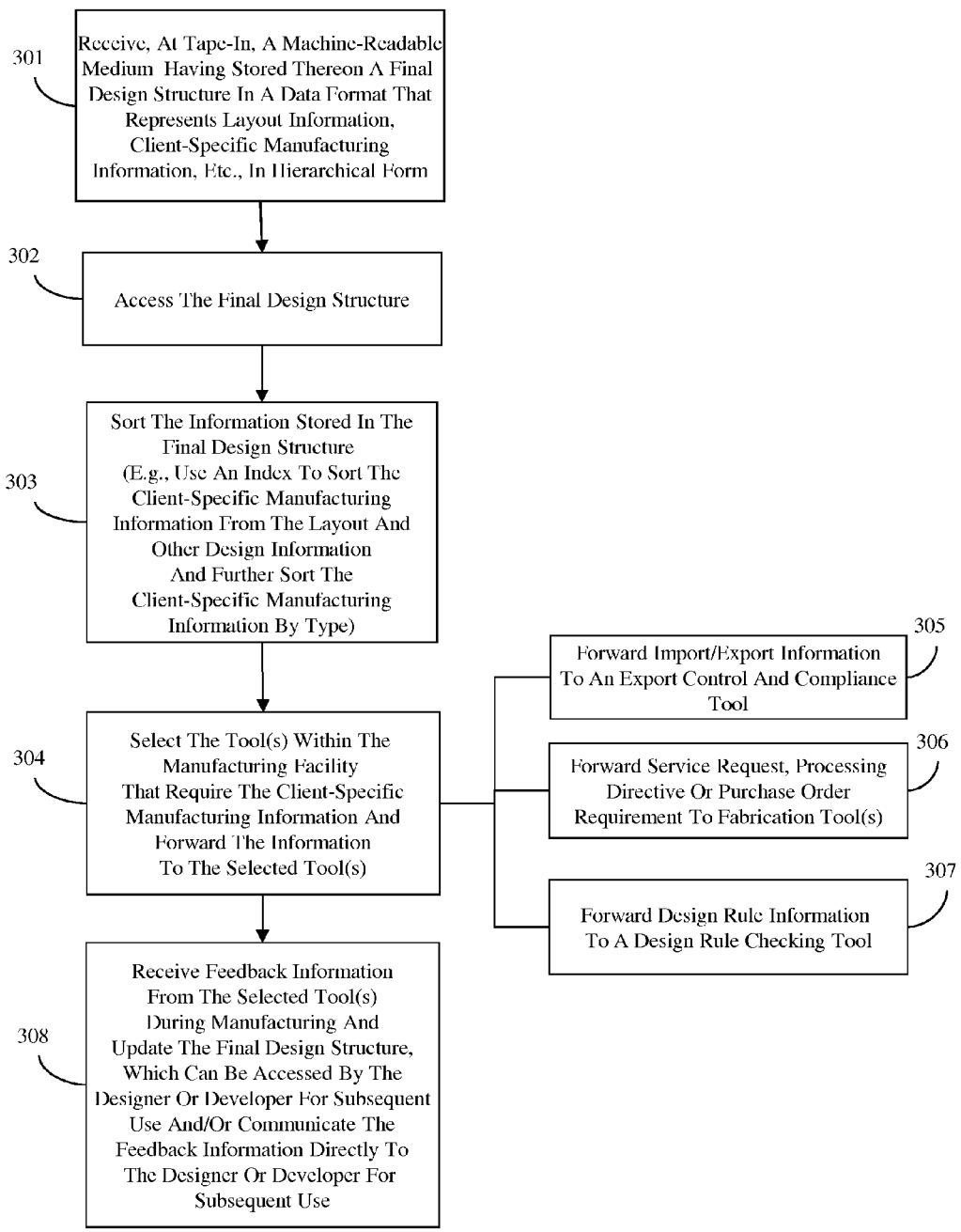
FIG. 3 is a flow diagram illustrating an embodiment of a computer-implemented manufacturing control method.

Referring to FIG. 3, also disclosed herein are embodiments of a computer-implemented manufacturing control method. This manufacturing control method can comprise receiving (e.g., by a computer system and, particularly, by a manufacturing control system at tape-in) a machine-readable medium having stored thereon a final design structure (301).

Specifically, this final design structure can comprise a final design structure, such as the final design structure 190 described in detail above with regard to the design method embodiment and illustrated in FIG. 1. That is, this final design structure can comprise at least the layout information for the integrated circuit and client-specific manufacturing information for the integrated circuit. The client-specific manufacturing information can include, but is not limited to, client-specific import/export information, client-specific service requests, client-specific processing directives, purchase order requirements, client-specific design rule information, or any other client-specified manufacturing information. For example, the client-specific import/export information can comprise, for example, web-based import/export forms, an export control classification number (ECCN), an international traffic arms (ITAR) number, a harmonized system (HS) classification number, etc. for the integrated circuit or product within which it will be incorporated. Client-specific service requests can comprise, for example, service requests for backside grinding, for dicing, for formation of kerf structures for in-process testing, etc. Client-specific processing directives can comprise effective channel length (Leff) striping, threshold voltage (Vt) splitting, custom processing, etc. The purchase order requirements can comprise, for example, the number of wafers, etc. The client-specific design rule information can comprise, client-submitted logs, the design rule checking (DRC) deck version used, the ground rules (GR) checked, etc. Additionally, this final design structure can be stored on the machine-readable medium in a data format (e.g., a graphic data system (GDS) II format or open artwork system interchange standard (OASIS) format) that represents the layout information and the client-specific manufacturing information in hierarchical form.

Following tape-in, the final design structure can be accessed and the information contained therein can be sorted (e.g., by a parsing tool within the manufacturing control system) (302-303). Specifically, the client-specific manufacturing information can be sorted from the layout and other information and can further be sorted by type. This can be accomplished using, for example, an index, such as the index 193 described in detail above and illustrated in the table of FIG. 2, which maps the different types of information in the final design structure, including the client-specific manufacturing information to the different data format levels that represent them. For example, client-specific import/export information is represented in layers 201-210, client-specific service requests are represented in layers 211-220, client-specific processing directives are represented in layers 221-230, purchase order requirements are represented in layers 231-240, and client-specific design rule information is represented in layers 241-250, and so on.

Once the information in the final design structure is sorted, any tools within the manufacturing facility which require the client-specific manufacturing information can be selected (e.g., by a logistics tool within manufacturing control system) and the client-specific information can be forwarded, as appropriate, to the selected tool(s) for use during manufacturing of the integrated circuit (304). For example, when the client-specific manufacturing information comprises import/export information, an export control and compliance tool can be selected and the import/export information can be forwarded to this tool to ensure that, based on the import/export information, the manufacturing of the integrated circuit and any subsequent export of the integrated circuit or product containing it comply with applicable export control restrictions (305). When the client-specific manufacturing information is a service request, a processing directive or a purchase order requirement, one or more mask building or fabrication tools, which performs mask building or fabrication processes during the manufacturing of the integrated circuit, can be selected and the service request, processing directive or purchase order requirement can be forwarded to the such tool(s) in order to ensure that the service request, processing directive or purchase order requirement is met (306). When the client-specific manufacturing information is client-provided design rule information, a design rule checking tool can be selected and the design rule information along with other information (e.g., layout information) can be forwarded to the design rule checking tool to perform design rule checking (307).

Finally, the manufacturing control method can comprise receiving (e.g., by a feedback tool of the manufacturing control system) feedback information from the selected tool(s) during the manufacturing of the integrated circuit to allow for updating of the client-specific manufacturing information (308). The feedback information can include, but is not limited to, information indicating mistakes or errors in the originally provided client-specific information. Updating of the client-specific information based on the feedback information can entail directly overwriting the locally stored final design structure to update the client-specific information for use either in subsequent manufacturing processes by the manufacturing facility or, if practical, in the current manufacturing processes being performed by the manufacturing facility. This locally stored and updated final design structure can then be accessed by the designer or developer for subsequent processing.

For example, the manufacturing facilities processing the final design structure can update the final design structure on a layer by layer based on the feedback information from the selected tools, thereby creating an updated final design structure, which is stored on the machine-readable medium. This updated final design structure can then be accessed and used (e.g., by a computer aided design (CAD) system of the designer or developer) to similarly update the client-specific manufacturing information or any other information in the final design structure, which is provided to other manufacturing facilities. That is, the updated final design structure can then be released to the other manufacturing facilities, thereby allowing the other manufacturing facilities to make modifications in subsequent manufacturing processes or, if practical, to the current manufacturing processes in order to ensure uniform results.

Updating of the client-specific information based on the feedback information can additionally or alternatively entail communicating the feedback information directly back to the designer or developer that generated it. The designer or developer can then overwrite the final design structure to update the client-specific manufacturing information or any other information and re-release it for use in subsequent manufacturing processes performed by any manufacturing facility manufacturing the integrated circuit or, if practical, in the current manufacturing processes being performed by any manufacturing facilities manufacturing the integrated circuit in order to ensure uniform results.

It should be understood that the above-described manufacturing control method can incorporate various other processes (e.g., routing and monitoring). However, since such processes are well known in the art, they have been omitted from this specification in order to allow the reader to focus on the salient aspects of the disclosed embodiments.

Figure 4:
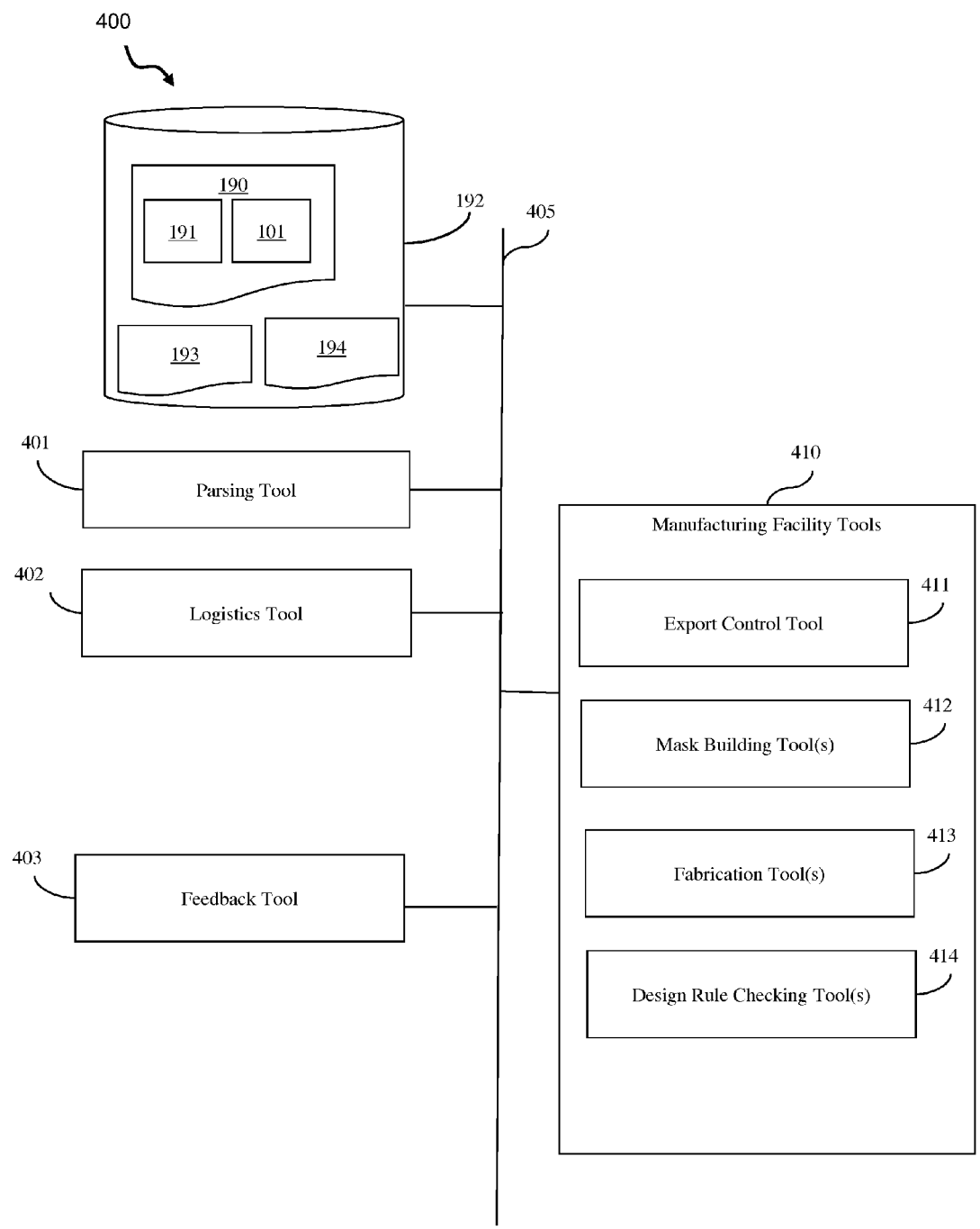
FIG. 4 is a schematic diagram illustrating an embodiment of a computer-implemented manufacturing control system.
Figure 5:
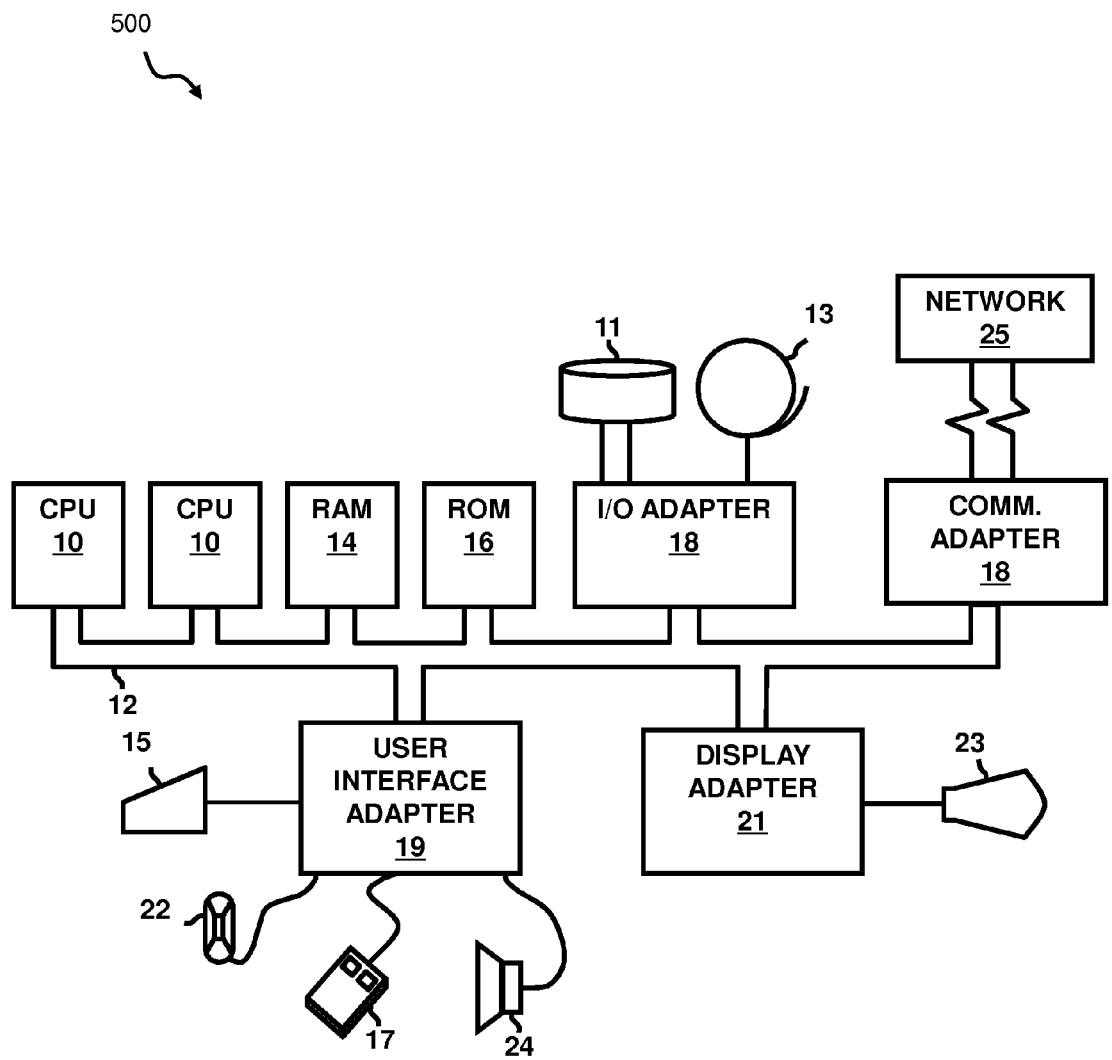
FIG. 5 is representative hardware environment for practicing the disclosed embodiments.

Referring to FIG. 4, also disclosed herein are embodiments of a computer-implemented manufacturing control system 400. This manufacturing control system 400 can be implemented, for example, in a computer hardware environment 500 such as that described in detail below and depicted in FIG. 5. Specifically, the system 400 embodiments can comprise at least memory (e.g., a machine-readable medium) and at least one processor (i.e., computer processing units) in communication with the memory device(s) (e.g., over a system bus 405 or other wireless communication means).

The machine-readable medium can comprise, for example, essentially the same machine-readable medium 192, described above, illustrated in FIG. 1, and output at tape-out as the final results of a design flow 100. Specifically, this machine-readable medium 192 can store a final design structure 190 for an integrated circuit and the final design structure 190 can comprise at least the layout information 191 for the integrated circuit and client-specific manufacturing information 101 for the integrated circuit. The client-specific manufacturing information 101 can include, but is not limited to, client-specific import/export information, client-specific service requests, client-specific processing directives, purchase order requirements, client-specific design rule information, or any other client-specified manufacturing information. For example, the client-specific import/export information can comprise, for example, web-based import/export forms, an export control classification number (ECCN), an international traffic arms (ITAR) number, a harmonized system (HS) classification number, etc. for the integrated circuit or product within which it will be incorporated. Client-specific service requests can comprise, for example, service requests for backside grinding, for dicing, for formation of kerf structures for in-process testing, etc. Client-specific processing directives can comprise effective channel length (Leff) striping, threshold voltage (Vt) splitting, custom processing, etc. The purchase order requirements can comprise, for example, the number of wafers, etc. The client-specific design rule information can comprise, client-submitted logs, the design rule checking (DRC) deck version used, the ground rules (GR) checked, etc. Additionally, this final design structure 190 can be stored on the machine-readable medium 192 in a data format (e.g., a graphic data system (GDS) II format or open artwork system interchange standard (OASIS) format) that represents the layout information and the client-specific manufacturing information in hierarchical form.

The processor(s) can comprise a parsing tool 401, a logistics tool 402 and, optionally, a feedback tool 403.

The parsing tool 401 can access (i.e., can be adapted to access, programmed to access, configured to access, etc.) the final design structure 190 following tape-in and can sort (i.e., can be adapted to sort, programmed to sort, configured to sort, etc.) the information contained therein. That is, the parsing tool 401 can sort the client-specific manufacturing information 101 from the layout 191 and other information and can further sort the client-specific manufacturing information by type. Specifically, the parsing tool 401 can sort the information using, for example, an index 193 stored with the final design structure 190 on the machine-readable medium 192. As described in detail above and illustrated in the table of FIG. 2, this index 193 can map the different types of information in the final design structure, including the client-specific manufacturing information to the different data format levels that represent them. For example, client-specific import/export information is represented in layers 201-210, client-specific service requests are represented in layers 211-220, client-specific processing directives are represented in layers 221-230, purchase order requirements are represented in layers 231-240, and client-specific design rule information is represented in layers 241-250, and so on.

The logistics tool 402 can identify and select (i.e., can be adapted to identify and select, can be configured to identify and select, can be programmed to identify and select, etc.) any of the tools 410 within the manufacturing facility which require the client-specific manufacturing information and can forward the information, as appropriate, to the selected tool(s) for use during manufacturing of the integrated circuit. For example, when the client-specific manufacturing information comprises import/export information, the logistics tool 402 can identify and select an export control and compliance tool 411 and can forward the import/export information to this export control and compliance tool 411 to ensure that, based on the import/export information, the manufacturing of the integrated circuit and any subsequent export of the integrated circuit or product containing it comply with applicable export control restrictions. When the client-specific manufacturing information is a service request, a processing directive or a purchase order requirement, the logistics tool 402 can identify and select one or more mask building or fabrication tools 412-413, which perform mask building or fabrication processes during the manufacturing of the integrated circuit, and can forward the service request, processing directive or purchase order requirement to the such tool(s) in order to ensure that the service request, processing directive or purchase order requirement is met. When the client-specific manufacturing information is client-provided design rule information, the logistics tool 402 can identify and select a design rule checking tool 414 and can forward the design rule information along with other information (e.g., layout information) to the design rule checking tool 414 to perform design rule checking.

Optionally, a feedback tool 403 can receive (i.e., can be adapted to receive, can be configured to receive, can be programmed to receive, etc.) feedback information from the selected tool(s) 411-414 during the manufacturing of the integrated circuit to allow for updating of the client-specific manufacturing information. The feedback information can include, but is not limited to, information indicating mistakes or errors in the originally provided client-specific information. The feedback tool 403 can further update (i.e., can be adapted to update, programmed to update, configured to update, etc.) the client-specific information 101, based on the feedback information from the tools 411-414, by directly overwriting the locally stored final design structure so that it can be used either in subsequent manufacturing processes by the manufacturing facility or, if practical, in the current manufacturing processes being performed by the manufacturing facility. For example, the feedback tool 403 can update the final design structure 190 on a layer by layer based on feedback information, thereby creating an updated final design structure 194, which is similarly stored on the machine-readable medium 192. This updated final design structure 194 can then be accessed and used by the CAD system of the developer or designer that generated the initial final design structure to similarly update the client-specific manufacturing information or any other information in the final design structure, which is provided to other manufacturing facilities. That is, the updated final design structure 194 can be released o the other manufacturing facilities, thereby allowing the other manufacturing facilities to make modifications in subsequent manufacturing processes or, if practical, to the current manufacturing processes in order to ensure uniform results.

Alternatively or additionally, the feedback tool 403 can communicate (i.e., can be adapted to communicate, programmed to communicate, configured to communicate, etc.) the feedback information directly back to the designer or developer that generated it (e.g., via a message, email, etc.). The designer or developer can then overwrite the final design structure to update the client-specific manufacturing information or any other information and re-release it for use in subsequent manufacturing processes performed by any manufacturing facility manufacturing the integrated circuit or, if practical, in the current manufacturing processes being performed by any manufacturing facilities manufacturing the integrated circuit.

It should be understood that the above-described manufacturing control system can incorporate various other components (e.g., a process routing tool and a process monitoring tool). However, since such components are well known in the art, they have been omitted from this specification in order to allow the reader to focus on the salient aspects of the disclosed embodiments.

Also disclosed herein are embodiments of a computer program product. The computer program product can comprise a program storage device readable by a computer and tangibly embodying a program of instructions that is executable by the computer to perform any of the above-described computer-implemented methods (e.g., the computer-implemented design method or the computer-implemented manufacturing control method). More particularly, as will be appreciated by one skilled in the art, aspects of disclosed embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosed embodiments may take the form of a computer program product embodied in one or more computer readable medium(s) having computer readable program code embodied thereon.

Any combination of one or more computer readable medium(s) may be utilized. The computer readable medium may be a non-transitory computer readable storage medium or computer readable signal medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the disclosed embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed embodiments are described above with reference to flowchart illustrations and/or block diagrams of methods, apparatus (systems) and computer program products. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A representative hardware environment for practicing the method, system and computer program product embodiments discussed above is depicted in FIG. 5. This schematic drawing illustrates a hardware configuration of an information handling/computer system in accordance with the embodiments. The system 500 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should further be understood that the terminology used herein is for the purpose of describing particular embodiments only and is not intended to be limiting. As used herein, the singular forms "a", "an" and "the" are intended to include the plural forms as well, unless the context clearly indicates otherwise. It should further be understood that the terms "comprises" "comprising", "includes" and/or "including", as used in this specification, specify the presence of stated features, integers, steps, operations, elements, and/or components, but do not preclude the presence or addition of one or more other features, integers, steps, operations, elements, components, and/or groups thereof. Additionally, it should be understood that the corresponding structures, materials, acts, and equivalents of all means or step plus function elements in the claims below are intended to include any structure, material, or act for performing the function in combination with other claimed elements as specifically claimed. The description of the disclosed embodiments has been presented for purposes of illustration and is not intended to be exhaustive. Many modifications and variations will be apparent to those of ordinary skill in the art without departing from the scope and spirit of the disclosed embodiments.

Therefore, disclosed above are embodiments of an improved design method (i.e., an improved design flow), the results of which are a final design structure for an integrated circuit that incorporates, not only layout information, but also client-specific manufacturing information (e.g., import/export information, service requests, processing directives, purchase order requirements, design rule information, etc.) in the same data format in hierarchical form. Also disclosed herein are embodiments of a manufacturing control method and an associated system. In these embodiments, a final design structure, such as that described above, is accessed (e.g., by the manufacturing control system of a manufacturing facility). The information contained within the final design structure and, particularly, the client-specific manufacturing information is sorted by type and then forwarded to the appropriate tools within the manufacturing facility for processing. By providing the client-specific manufacturing information directly to each manufacturing facility in the final design structure in conjunction with the layout information, the embodiments eliminate the need for independent information gathering by each manufacturing facility and, thereby provide for more uniform results across the different manufacturing facilities.

What is claimed is:

1. A design method comprising:
generating, by a computer system, a design structure for an integrated circuit, said design structure comprising at least layout information for said integrated circuit and client-specific manufacturing information for said integrated circuit, said client-specific manufacturing information comprising client-specific service requests for services to be performed by a manufacturing facility during manufacturing of said integrated circuit, client-specific processing directives for processing to be performed by said manufacturing facility during said manufacturing of said integrated circuit and purchase order requirements for said integrated circuit;
storing, by said computer system on a machine-readable medium, said design structure for said integrated circuit in a data format that represents said layout information and said client-specific manufacturing information in hierarchical form with different types of said client-specific manufacturing information at different data format levels in said data format;
storing, by said computer system on said machine-readable medium, an index of said client-specific manufacturing information by type and data format level for subsequent sorting and use by said manufacturing facility, said index mapping said different types of said client-specific manufacturing information to said different data format levels of said data format;
releasing said machine-readable medium to said manufacturing facility;
accessing an updated final design structure created by said manufacturing facility based on feedback information received by said manufacturing facility during processing of said final design structure; and
updating final design structures provided to other manufacturing facilities based on said updated final design structure created by said manufacturing facility.

2. The design method of claim 1, said data format comprising any one of graphic data system (GDS) II format and open artwork system interchange standard (OASIS) format.

3. The design method of claim 1, said client-specific manufacturing information further comprising import/export information, said import/export information comprising at least one of import/export forms, an export control classification number, an international traffic arms number and a harmonized system classification number.

4. The design method of claim 1,
said client-specific service requests comprising at least one of a service request for backside grinding, a service request for dicing, a service request for formation of kerf structures for in-process testing,
said client-specific processing directives comprising processing directives for at least one of effective channel length striping, threshold voltage splitting, and custom processing, and
said purchase order requirements comprising at least a number of wafers.

5. The design method of claim 1, said client-specific manufacturing information further comprising client-specific design rule information comprising at least one of client-submitted logs, a design rule checking deck version used, and ground rules checked.

6. A manufacturing control method comprising:
accessing, by a computer system from a machine-readable medium, a design structure for an integrated circuit,
said design structure comprising at least layout information for said integrated circuit and client-specific manufacturing information for said integrated circuit,
said client-specific manufacturing information comprising client-specific service requests for services to be performed by a manufacturing facility during manufacturing of said integrated circuit, client-specific processing directives for processing to be performed by said manufacturing facility during said manufacturing of said integrated circuit and purchase order requirements for said integrated circuit,
said design structure being stored on said machine-readable medium in a data format that represents said layout information and said client-specific manufacturing information in hierarchical form with different types of said client-specific manufacturing information at different data format levels in said data format, and said machine-readable medium further storing an index of said client-specific manufacturing information by type and data format level, said index mapping said different types of said client-specific manufacturing information to said different data format levels of said data format;

sorting, by said computer system, said client-specific manufacturing information from said layout information in said design structure, said sorting being performed using said index;

selecting, based on said different types of said client-specific manufacturing information, at least one selected tool of said manufacturing facility requiring said client-specific manufacturing information; and forwarding, by said computer system, said client-specific manufacturing information to said at least one selected tool of said manufacturing facility for use during manufacturing of said integrated circuit to ensure that said services requests, said processing directives and said purchase order requirements are met.

7. The method of claim 6, said data format comprising any one of graphic data system (GDS) II format and open artwork system interchange standard (OASIS) format.

8. The method of claim 6,
said client-specific service requests comprising at least one of a service request for backside grinding, a service request for dicing, a service request for formation of kerf structures for in-process testing,
said client-specific processing directives comprising processing directives for at least one of effective channel length striping, threshold voltage splitting, and custom processing, and
said purchase order requirements comprising at least a number of wafers.

9. The method of claim 8,
said client-specific manufacturing information further comprising import/export information comprising at least one of import/export forms, an export control classification number, an international traffic arms number and a harmonized system classification number, and
said forwarding of said client-specific manufacturing information to said at least one selected tool comprising forwarding said import/export information to an export control and compliance tool.

10. The method of claim 8, said forwarding of said client-specific manufacturing information to said at least one selected tool comprising forwarding said at least one of said client-specific service requests, said client-specific processing directives and said purchase order requirements to at least one fabrication tool that performs at least one fabrication process during said manufacturing of said integrated circuit such that said any of said client-specific service requests, said client-specific processing directives and said purchase order requirements are met.

11. The method of claim 8,
said client-specific manufacturing information comprising client-specific design rule information comprising at least one of client-submitted logs, a design rule checking deck version used, and ground rules checked, and
said forwarding of said client-specific manufacturing information to said at least one selected tool comprising forwarding said client-specific design rule information to a design rule checking tool that receives said layout information and said client-specific design rule information and performs design rule checking.

12. The method of claim 6, further comprising receiving, by said computer system, feedback information from said at least one selected tool during said manufacturing of said integrated circuit to allow for updating of said design structure.

13. A manufacturing control system comprising:
a non-transitory machine-readable medium storing a design structure for an integrated circuit,
said design structure comprising at least layout information for said integrated circuit and client-specific manufacturing information for said integrated circuit,
said client-specific manufacturing information comprising client-specific service requests for services to be performed by a manufacturing facility during manufacturing of said integrated circuit, client-specific processing directives for processing to be performed by said manufacturing facility during said manufacturing of said integrated circuit and purchase order requirements for said integrated circuit,
said design structure being stored on said machine-readable medium in a data format that represents said layout information and said client-specific manufacturing information in hierarchical form with different types of said client-specific manufacturing information at different data format levels in said data format, and
said machine-readable medium further storing an index of said client-specific manufacturing information by type and data format level, said index mapping said different types of said client-specific manufacturing information to said different data format levels of said data format; and
at least one processor comprising:
a parsing tool accessing said design structure and sorting said client-specific manufacturing information from said layout information in said design structure using said index; and
a logistics tool selecting, based on said different types of said client-specific manufacturing information, at least one selected tool of said manufacturing facility requiring said client-specific manufacturing information, said logistics tool further forwarding said client-specific manufacturing information to said at least one selected tool for use during manufacturing of said integrated circuit to ensure that said service request, said processing directives and said purchase order requirements are met.

14. The system of claim 13, said data format comprising any one of graphic data system (GDS) II format and open artwork system interchange standard (OASIS) format.

15. The system of claim 13,
said client-specific manufacturing information further comprising import/export information comprising at least one of import/export forms, an export control classification number, an international traffic arms number and a harmonized system classification number, and
said logistics tool forwarding said import/export information to an export control and compliance tool.

16. The system of claim 13,
said client-specific service requests comprising at least one of a service request for backside grinding, a service request for dicing, a service request for formation of kerf structures for in-process testing,
said client-specific processing directives comprising processing directives for at least one of effective channel length striping, threshold voltage splitting, and custom processing,
said purchase order requirements comprising at least a number of wafers, and said logistics tool forwarding said at least one of said client-specific service requests, said client-specific processing directives and said purchase order requirements to at least one fabrication tool that performs at least one fabrication process during said manufacturing of said integrated circuit such that said one of said at least one of said client-specific service requests, said client-specific processing directives and said purchase order requirements are met.

17. The system of claim 13, said client-specific manufacturing information further comprising client-specific design rule information comprising at least one of client-submitted logs, a design rule checking deck version used, and ground rules checked, and said logistics tool forwarding said client-specific design rule information to a design rule checking tool that receives said layout information and said client-specific design rule information and performs design rule checking.

18. The system of claim 13, said at least one processor further comprising a feedback tool receiving feedback information from said at least one selected tool during said manufacturing of said integrated circuit to allow for updating of said design structure.

* * * * *